United States Patent
Rustagi et al.

(10) Patent No.: US 6,912,576 B1
(45) Date of Patent: Jun. 28, 2005

(54) SYSTEM AND METHOD OF PROCESSING DATA FLOW IN MULTI-CHANNEL, MULTI-SERVICE ENVIRONMENT BY DYNAMICALLY ALLOCATING A SOCKET

(75) Inventors: Viresh Rustagi, Santa Clara, CA (US); Robert S. French, Sunnyvale, CA (US); Garald H. Banta, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/565,580

(22) Filed: May 4, 2000

(51) Int. Cl.[7] ............................................. G06F 15/173
(52) U.S. Cl. .................. 709/226; 709/104; 709/229; 709/232; 379/207.02; 370/252; 718/104
(58) Field of Search ................... 709/104, 226, 709/229, 232, 205, 224, 223; 379/207.02; 370/352; 718/104; 707/10

(56) References Cited

U.S. PATENT DOCUMENTS

| | | | | |
|---|---|---|---|---|
| 5,400,401 A | * | 3/1995 | Wasilewski et al. | 380/212 |
| 5,652,832 A | * | 7/1997 | Kane et al. | 714/2 |
| 6,091,735 A | * | 7/2000 | Dodson et al. | 370/420 |
| 6,154,776 A | * | 11/2000 | Martin | 709/226 |
| 6,212,201 B1 | * | 4/2001 | Hinderks et al. | 370/468 |
| 6,219,669 B1 | * | 4/2001 | Haff et al. | 707/10 |
| 6,381,321 B1 | * | 4/2002 | Brown et al. | 379/207.02 |
| 6,591,290 B1 | * | 7/2003 | Clarisse et al. | 709/205 |
| 2002/0110111 A1 | * | 8/2002 | Couture | 370/352 |
| 2003/0005144 A1 | * | 1/2003 | Engel et al. | 709/235 |
| 2003/0056001 A1 | * | 3/2003 | Mate et al. | 709/238 |

FOREIGN PATENT DOCUMENTS

| | | | | |
|---|---|---|---|---|
| EP | 0 690 376 A2 | | 1/1996 | |
| EP | 0 794 491 A2 | | 9/1997 | |
| EP | 1174797 A2 | * | 1/2002 | G06F/11/36 |
| JP | 11031129 | * | 2/1999 | G06F/15/00 |

* cited by examiner

Primary Examiner—Hosain Alam
Assistant Examiner—Oanh Duong
(74) Attorney, Agent, or Firm—Christie, Parker & Hale, LLP

(57) ABSTRACT

A method and system for processing a data flow in a multi-channel, multi-service environment is described. In one embodiment, a socket is dynamically allocated, the socket including a dynamically allocated service. Further, the server processes the data flow based upon the type of data being processed.

77 Claims, 14 Drawing Sheets

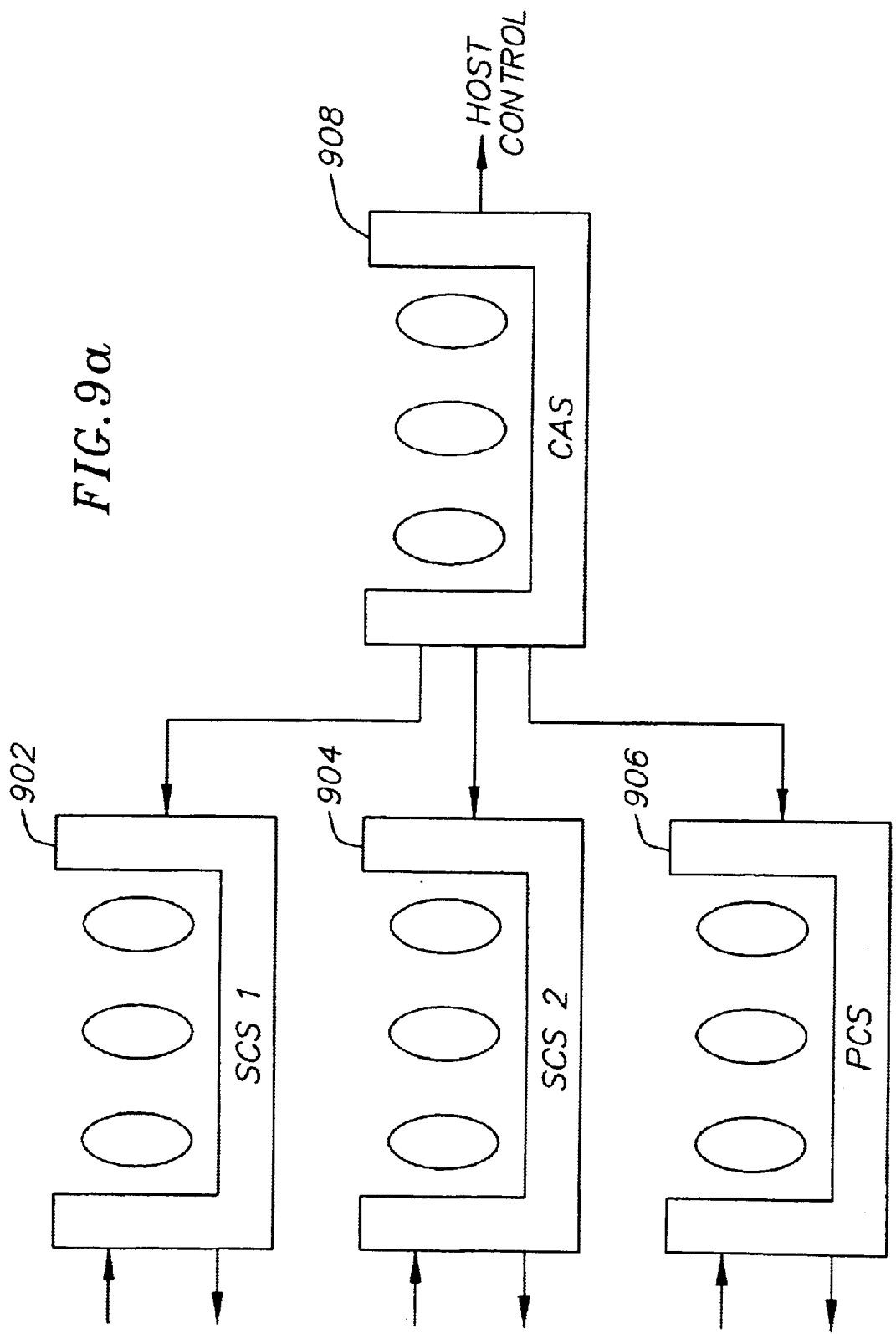

SYSTEM AND METHOD OF PROCESSING DATA FLOW IN MULTI-CHANNEL, MULTI-SERVICE ENVIRONMENT BY DYNAMICALLY ALLOCATING A SOCKET

FIELD OF THE INVENTION

The present invention relates to processing data and more specifically to processing a data flow in a multi-channel, multi-service development environment.

BACKGROUND OF THE INVENTION

Traditionally, Digital Signal Processors (DSPs) have been used to run single channels, such as, for example, a single DS0 or time division multiplexing (TDM) slot, that handle single services, such as modem, vocoder, or packet processing. Multiple services require multiple channels and multiple DSPs, each running its own small executive program (small kernal) and application. The executive programs reserve some area in memory for application code. When applications need to be switched, these executive programs overlay this memory with the new application.

Channels may take one of the following forms: one channel carried on a physical wire or wireless medium between systems (also referred to as a circuit); timed divisional multiplexed (TDM) channels in which signals from several sources such as telephones and computers are merged into a single stream of data and separated by a time interval; and frequency division multiplexed (FDM) channels in which signals from many sources are transmitted over a single cable by modulating each signal on a carrier at different frequencies.

Recent advances in processing capacity now allow a single chip to run multiple channels. With this increase in capacity has come a desire to run different services simultaneously and to switch between services.

A current method to implement multiple services or multiple channels involves writing all control, overlay, and task-switching code for each service or channel. This requirement causes additional engineering overhead for development and debugging of the applications. In addition, not all services may fit into the memory available to the DSP, and the services must be swapped in from the host system. This swapping—overlaying—adds significant complexity to the implementation of the DSP services. The extra development activity consumes DSP application development time.

SUMMARY OF THE INVENTION

A method and system for processing a data flow in a multi-channel, multi-service environment is described. In one embodiment, a socket is dynamically allocated, the socket including a dynamically allocated service. Further, the server processes the data flow based upon the type of data being processed.

BRIEF DESCRIPTION OF THE DRAWINGS

The present invention is illustrated by way of example, and not by way of limitation in the figures of the accompanying drawings in which like reference numerals refer to similar elements.

FIG. 9a is a block diagram of one embodiment for a control aggregation socket (CAS) configuration;

DETAILED DESCRIPTION

Figure 1:
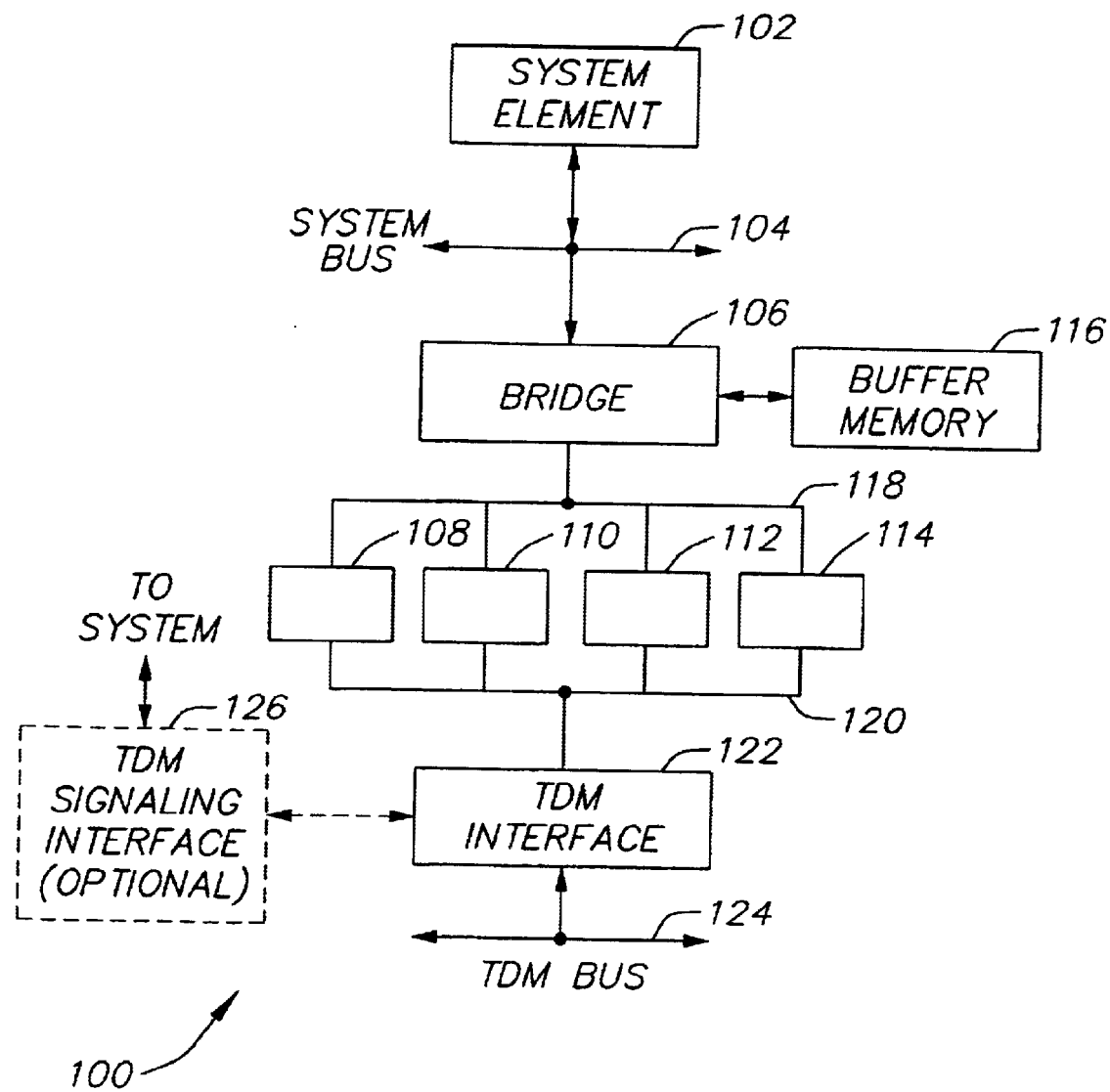
FIG. 1 is a system architecture of one embodiment for a multi-channel, multi-service system.

A method and system for processing a data flow in a multi-channel, multi-service environment is described. In one embodiment, a socket is dynamically allocated, the socket including a dynamically allocated service. Further, the server processes the data flow based upon the type of data being processed.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CDROMs, and magnetic-optical disks, read-only memories (ROMs), random access memories (RAMs), EPROMs, EEPROMS, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a system architecture of one embodiment for a multi-channel, multi-service system 100. Referring to FIG. 1, system element 102 is connected via system bus 104 and bridge 106 to a plurality of processing chips 108, 110, 112, 114. In addition, bridge 106 is connected to buffer memory 116. System element may be another bridge 106 configuration or other suitable component. Bridge 106 is connected via bus 118 to the processing chips 108–114. In one embodiment, processing chips 108–114 are connected via bus 120 to time division multiplexing (TDM) interface 122. In alternate embodiments, chips 108–114 may be connected to a digital signal 0 (DS0) interface or other applicable interface. In one embodiment, TDM interface 122 is connected to a number of modules and ports installed on the TDM bus 124. In addition, TDM interface 122 may optionally be connected to TDM signaling interface 126.

TDM is a base-band technology in which individual channels of data or voice are interleaved into a single stream of bits (or framed bits) on a communications channel. Each input channel receives an interleave time segment in order that all channels equally share the medium that is used for transmission. If a channel has nothing to send, the slot is still dedicated to the channel and remains empty.

In one embodiment, an operating system running within multi-channel, multi-service system 100 supports telecommunication and data communication applications. These applications involve running multiple channels of protocol stacks built from multiple services. Multi-channel, multi-service system 100 enables the dynamic configuration of services within the embedded telecommunication and data communication environment. In addition, the operating system automatically defines the allocation of resources for the channels within system 100.

In one embodiment, the operating system running within multi-channel, multi-service system 100 supports monitoring of channels in realtime. If a particular service within a channel is not responding as expected, the host system may request the operating system to send the state of one or all of its services to an off-chip application at prespecified events. For example, after processing every frame worth of data. The data is collected without affecting the socket's realtime performance. The off-chip application may then analyze the cause of the problem by inspecting the data in non-realtime.

Figure 2:
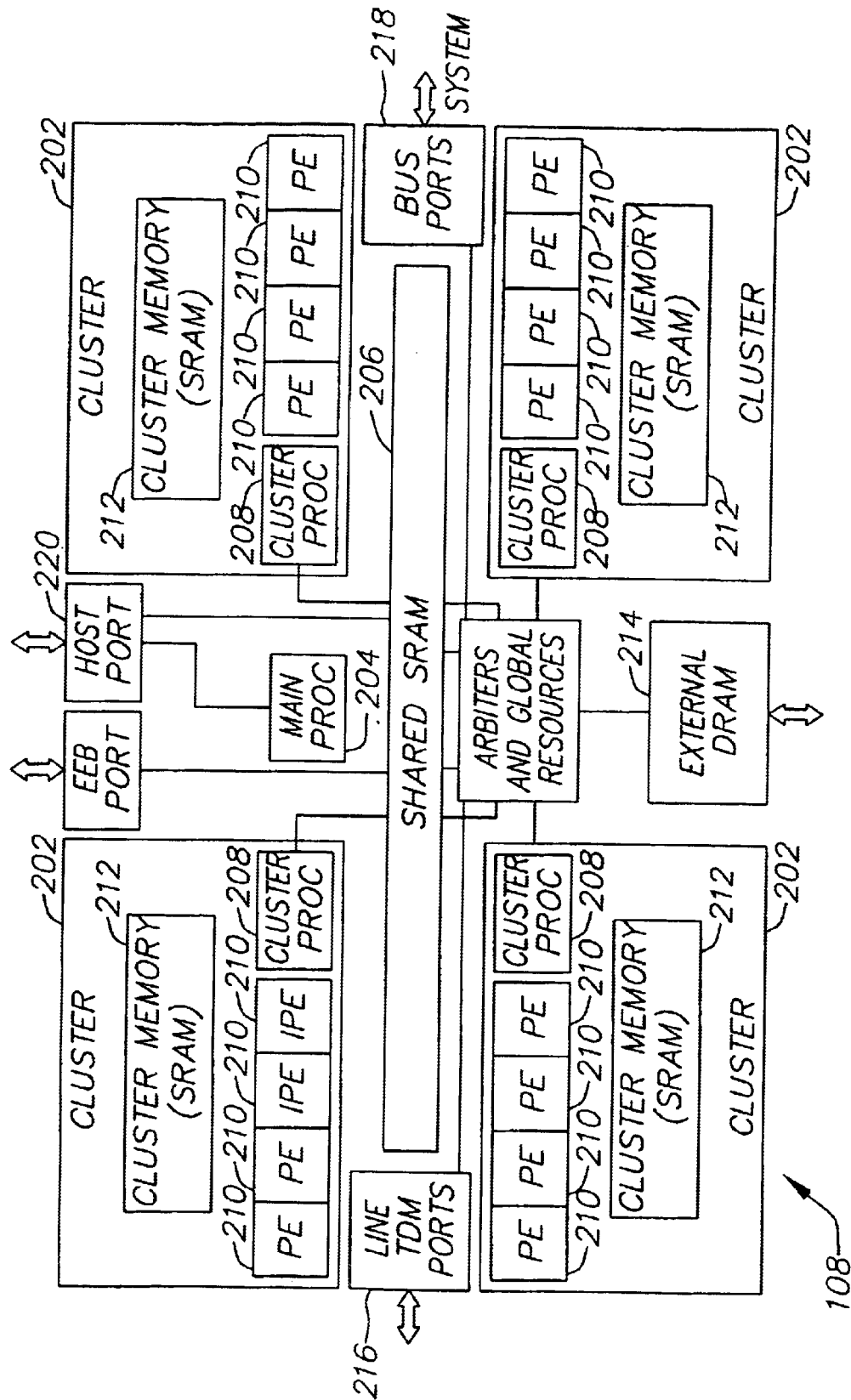
FIG. 2 is a block diagram of one embodiment for a processing chip of FIG. 1.

FIG. 2 is a block diagram of one embodiment for a processing chip 108. Each processing chip 108 contains clusters 202 and main processor 204. Each cluster 202 contains a cluster processor 208 and a number of processing engines (PEs) 210. Main processor 204 is configured to perform all control code and operations including receiving control messages from host 102 and allocating channels to the various clusters 202.

Processing chip 108 also includes a shared static random access memory (shared SRAM) 206. Shared SRAM 206 may be accessed directly by all the cluster processors 202 and main processor 204. An instruction store contained within the PEs 210 can also access shared SRAM 206. Shared SRAM 206 is used for storing operating system and application code as well as hosting the data for code running on main processor 204.

Each cluster 202 contains cluster SRAM 212. Cluster SRAM 212 is responsible for maintaining channel data running on each individual cluster 202. Cluster SRAM 212 includes I/O buffers and programming stacks. The operating system of system 100 enforces memory protection to prevent a channel from inadvertently corrupting another channel's data or code.

External dynamic random access memory (DRAM) 214 may be used for application data too large to fit on the on-chip duster SRAM 212 or shared SRAM 206 and may be used as a swap area for application code. In one embodiment, applications may need more data than the on-chip memory may support. In this case, the data and program for some of the services may be stored in off-chip memory (for example, DRAM 214). The program and data is loaded onto the on-chip memory as the channel's data processing begins. In this manner, the service is not aware of where the data and program resides on external memory. This is done without affecting the realtime performance of the applications.

Each processing chip 108 includes two line side ports 216 and two system bus ports 218. These ports are used for packet side data and control transport. In addition, host port 220 is used to communicate with the host 102 and is accessible only from main processor 204 and serial boot port that is used to send the boot stream to the chip.

Figure 3:
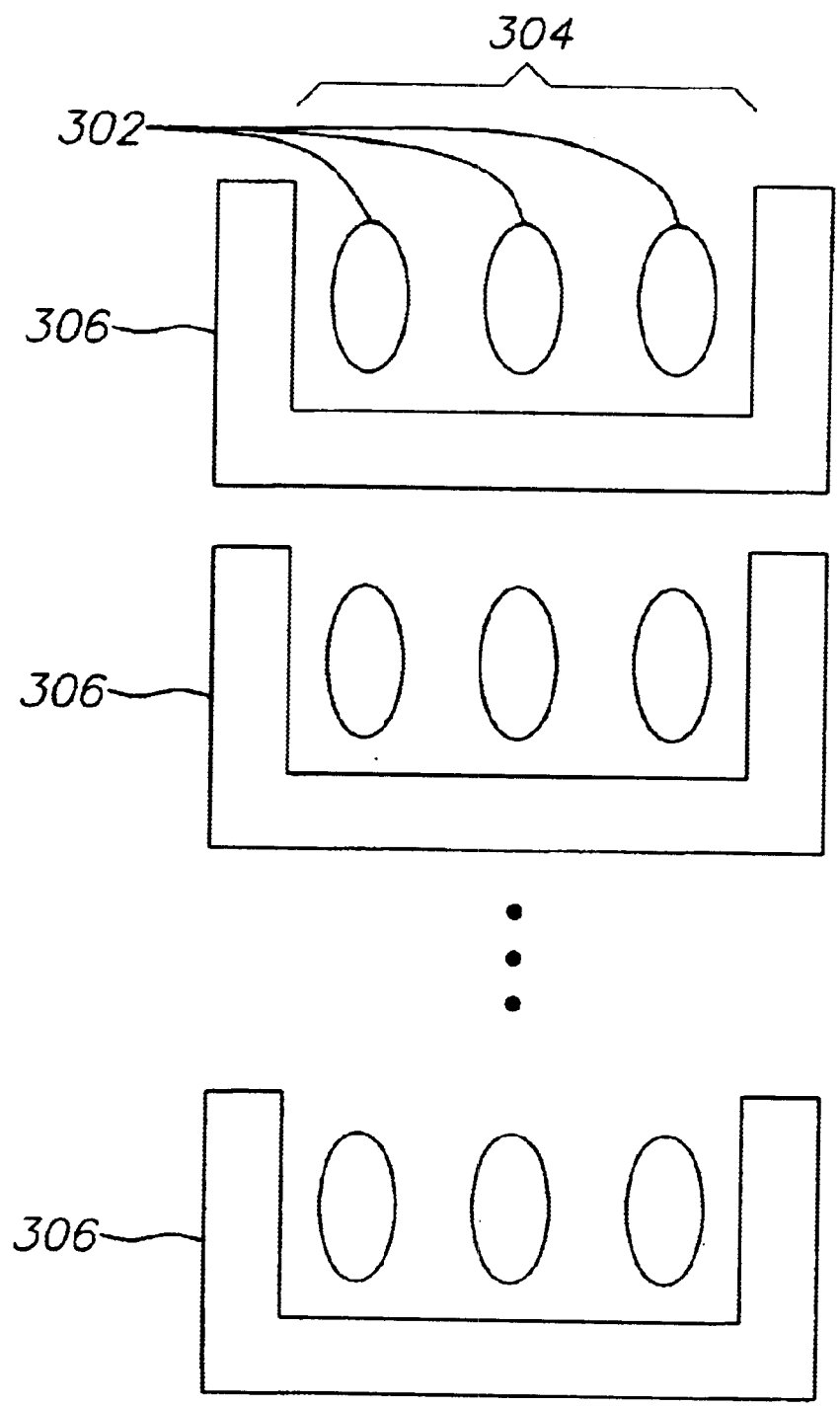
FIG. 3 is a block diagram of another embodiment for a multi channel, multi-service system.

FIG. 3 is a block diagram of another embodiment for a portion of a multi-channel, multi-service system 100. Referring to FIG. 3, service 302 is a self contained set of instructions that has data input/output, control, and a defined interface. Service 302 performs defined processing upon a certain amount and a certain format of data. In addition, service 302 emits a certain amount and a certain format of data. In an alternate embodiment, service 302 may process data in a bidirectional manner. Service stack 304 is a linked set of services 302 that provide a larger processing unit. Service stack 304 is a unique, ordered collection of services 302, such as, for example, echo cancellation services, tone detection services, and video or voice conferencing services. The services 302 within the service stack 304 are processed in-order.

Socket 306 is a virtual construct that provides a set of services 302 in the form of a service stack 304. The operating system processes services 302 that are encapsulated in socket 306 including connecting the traffic flow. The number of services 302 is dynamically adjustable and definable such that the need for multitasking is eliminated. Processing within socket 306 is data driven. That is, services 302 are invoked by sockets 306 only after the required data has arrived at socket 306. In one embodiment, applications may build protocol stacks by installing a service stack 304 into a socket 306. Services 302, service stacks 304, and sockets 306 are allocated and de-allocated as required by system 100.

Figure 4:
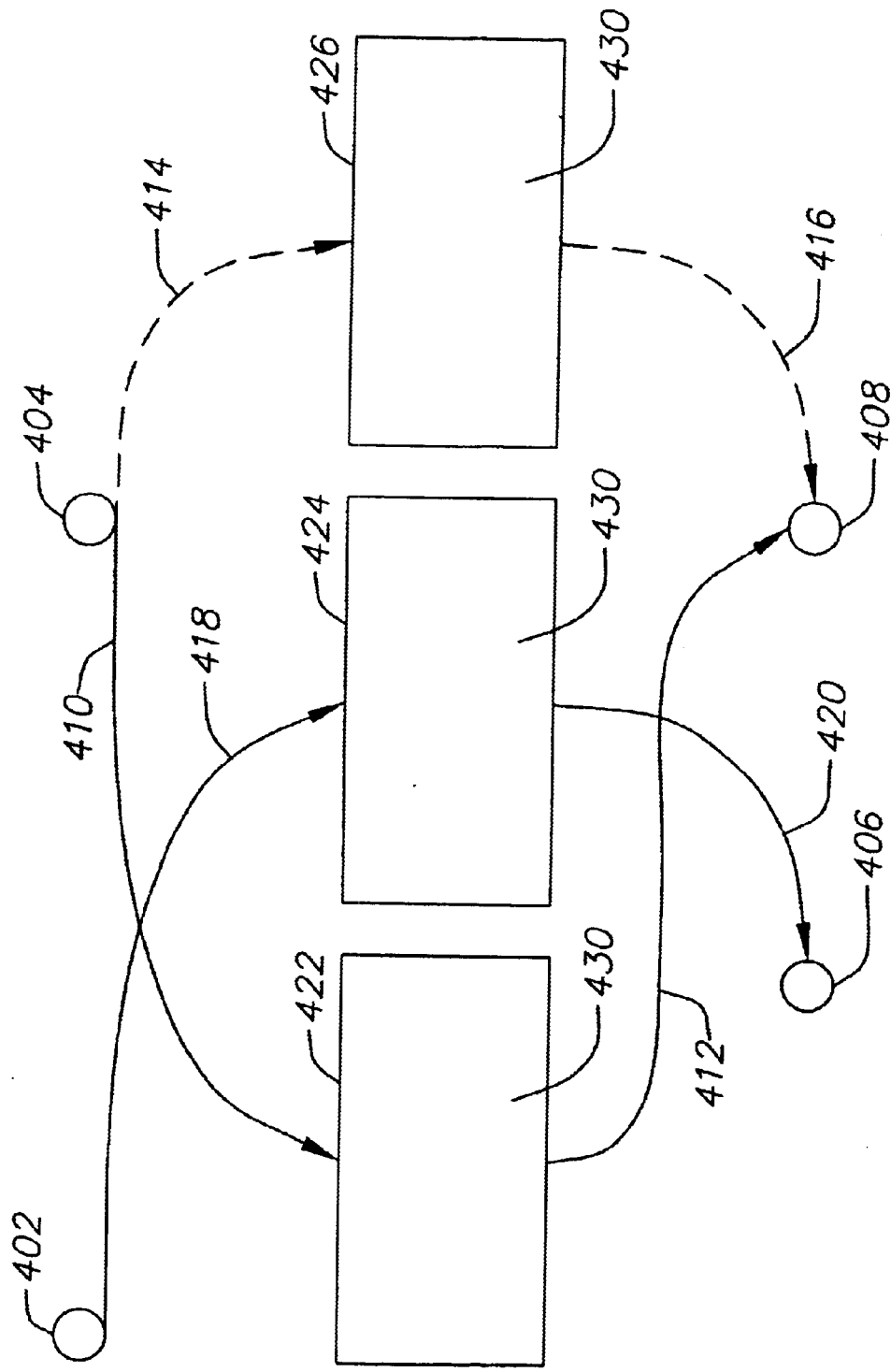
FIG. 4 is an exemplary diagram of channels within a multi-channel, multi-service system.

FIG. 4 is an exemplary diagram of channel sockets (CSs) 430 (422, 424, 426) within system 100. CSs 430 are specialized sockets 306 that direct the flow of information through the system 100 between two or more devices or end points 402, 404, 406, 408. End points may be, for example, physical devices. CS 430 is a socket 306 that accepts a service stack 304 and processes channel data. CS 430 connects any line side slot or bus channel on one end of CS 430 to any other line side slot or bus channel on the opposite end of CS 430. CS 430 has two main attributes: (1) a defined input/output that is implied by its function and location, and (2) an application programming interface (API) as seen by a device attached to CS 430. CS 430 is defined by external, physical interface points and provides the ability to process the service stack 304. Information may flow from a physical end point 402 via connection 418 to CS 424. The information is processed by services 302 within CS 424 and is transferred via connection 420 to end point 406. The operating system may dynamically change the flow of information through different CSs 430 depending upon the needs of the end points 402–408. For example, data may be initially set to flow from end point 404 via connection 410 through CS 422 and via connection 412 to end point 408. However, if service stack 304 within CS 422 is incompatible with the data, CS 422 notifies the operating system to break the flow and redirect the information. The operating system then redirects the flow to an existing CS 430 with the proper service stack 304 or creates a new CS 430. Referring to FIG. 4, the operating system may redirect the flow from end point 404 to end point 408 through connection 414, CS 426, and connection 416.

A CS 430 is defined by the external, physical interface end points 402, 404, 406, and 408 and the data flowing through the CS 430. Each end point 402–408 may be different physical devices or the same physical interface or device. The flow of information is directed by the manner in which the packet formats are created. The header information within the packets indicate the unique end points 402–408 that the information is being sent to and whether the information is going in or out of system 100. For example, CS 422 services may perform a conversion of data. The CS 430 mechanism allows a service stack 304 to be built into the information flow in which services 302 may direct or process the data as it flows through the system. For example, if a first service outputs a 40 byte data frame and a second service uses an 80 byte frame, in one embodiment, the second service waits until the first service outputs enough data in order for the second service to process the data. In an alternate embodiment, the first service delays sending data to the second service until it accumulates enough data. Services 302 are independent modules and are standalone plug-ins. Thus, in one embodiment, services 302 may be dynamically downloaded into shared SRAM 206 in real-time to build CSs 430 as required by the data.

Because sockets 306 may be dynamically allocated and deallocated by the operating system, applications may be written to access dedicated, single channel processors; however, the dedicated channels will run on multiple physical channels. Thus, the CS 430 mechanism provides single channel programming with multiple channel execution. In addition, an application may be written to provide flow of information between end points 402–408 independent of the operating system and independent of the type of data being processed. CS 430 functions, whether they are signal processing functions or packet processing functions, are independent of both the operating system and the hardware configuration. The mechanism also relieves applications of the management of channels and places the management into the operating system, thus producing channel independent applications. In addition, the CS 430 mechanism allows the applications and services 302 to be platform independent.

Figure 5:
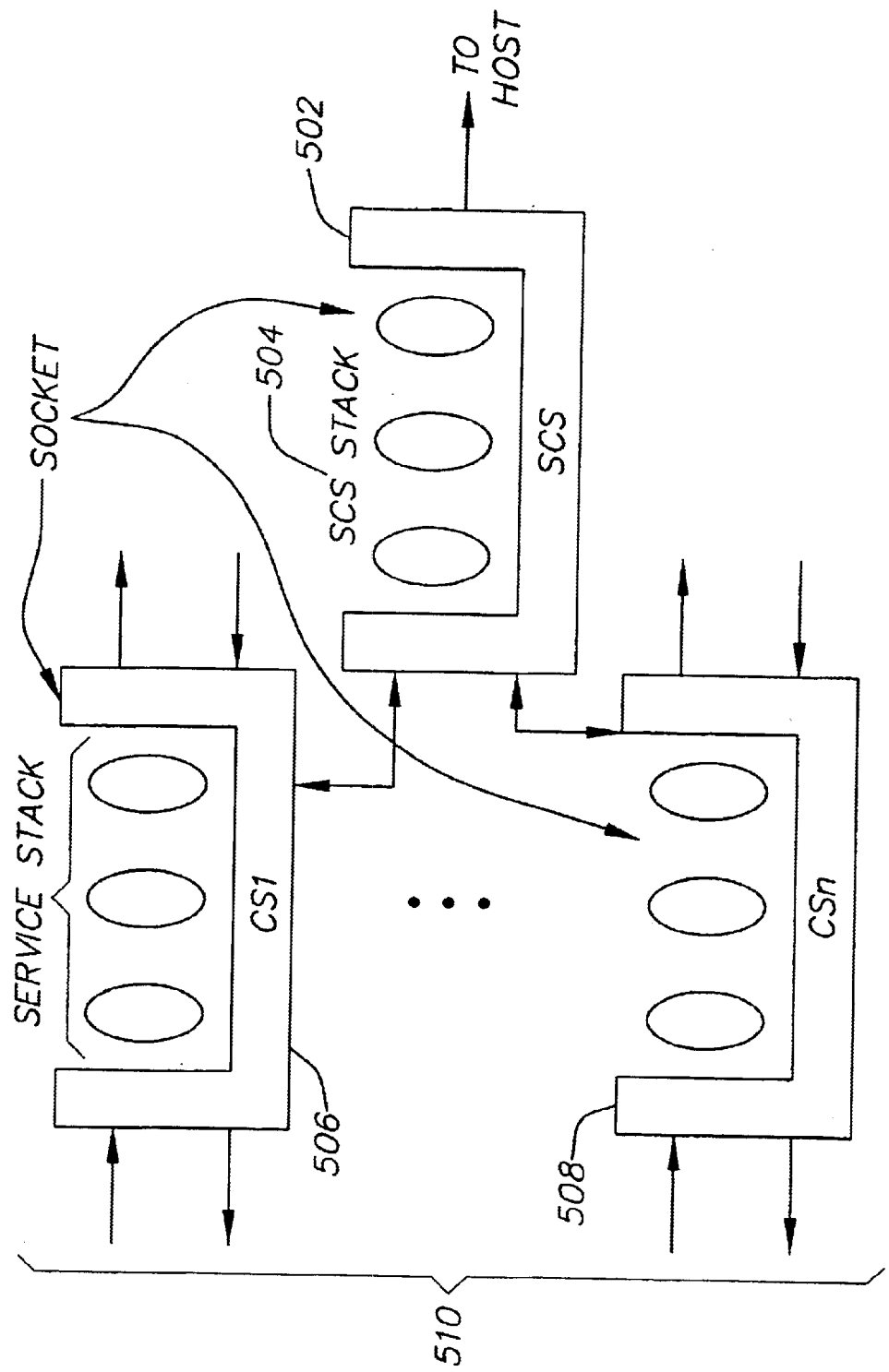
FIG. 5 is a block diagram of one embodiment for a service control socket (SCS) configuration.

FIG. 5 is a block diagram of another embodiment for a portion of a multi-channel, multi-service system 100. Referring to FIG. 5, system 100 includes SCS 502 which is connected to a host and to a plurality of CSs 510. Service control socket (SCS) 502 is a socket 306 containing the control portion of the services 302 for a service stack 304. Each unique service stack 504 has its own SCS 502. Each SCS 502 controls multiple instances of the same CS 510. Each service 302 within SCS 502 is the control portion for the respective service 302 within CS 510. Services 302 in a CS 510 service stack may a receive control messages from that stack's SCS 502. Each service 302 has a data domain and a control domain. The data domain is maintained within socket 306 and the control domain is maintained within SCS 502.

Figure 6:
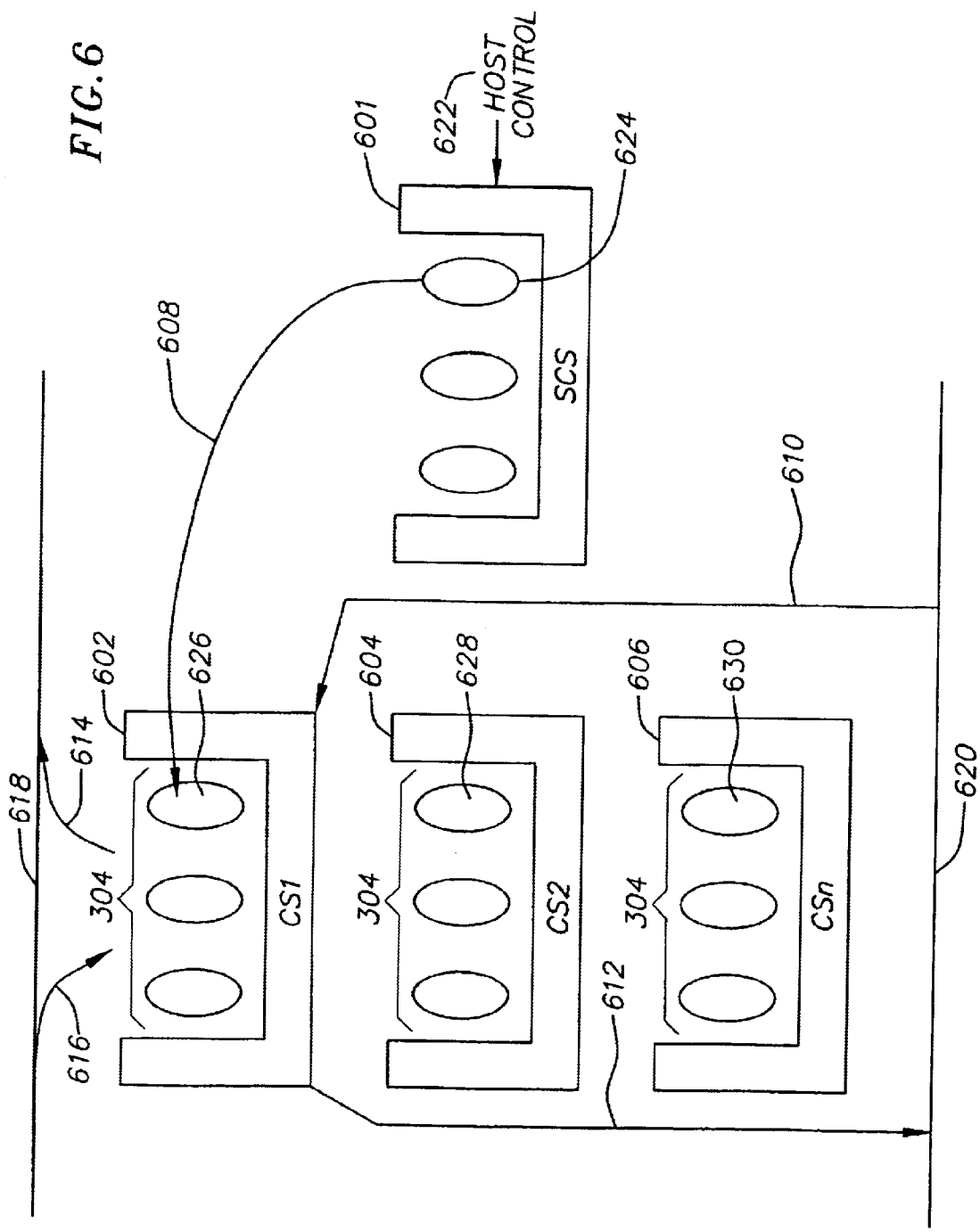
FIG. 6 is an exemplary block diagram for one embodiment of a SCS configuration.

FIG. 6 is a block diagram for another embodiment of a portion of a multi-channel, multi-service system 100. Referring to FIG. 6, system 100 includes SCS 601 that receives control information from a host at 622. Each service 302 has a data and control component. The control information specifies that control information is to be sent to a particular service 302 within a particular socket 306. In the FIG. 6 example, service controller 624 controls all information for that unique service 626, 628, 630 in which service 626, 628, 630 is an instantiation of the same service 302. SCS 601 contains all the control instructions for the particular service 626, 628, 630. Thus, SCS 601 controls all services contained within each socket 602, 604, and 606. Sockets 602, 604, and 606 each have the same service stack 304. Control service 624 controls the services 626, 628 and 630. When a command is received from the host, the command indicates both the service 302 and the socket 306 to send the control information to. Thus, in the FIG. 6 embodiment, the information received from the host indicates that a unique service (626, 628, or 630) is to be accessed and that socket 602 is to be accessed. Thus, SCS 502 sends the information via connection 608 to service 626 within socket 602.

Figure 7:
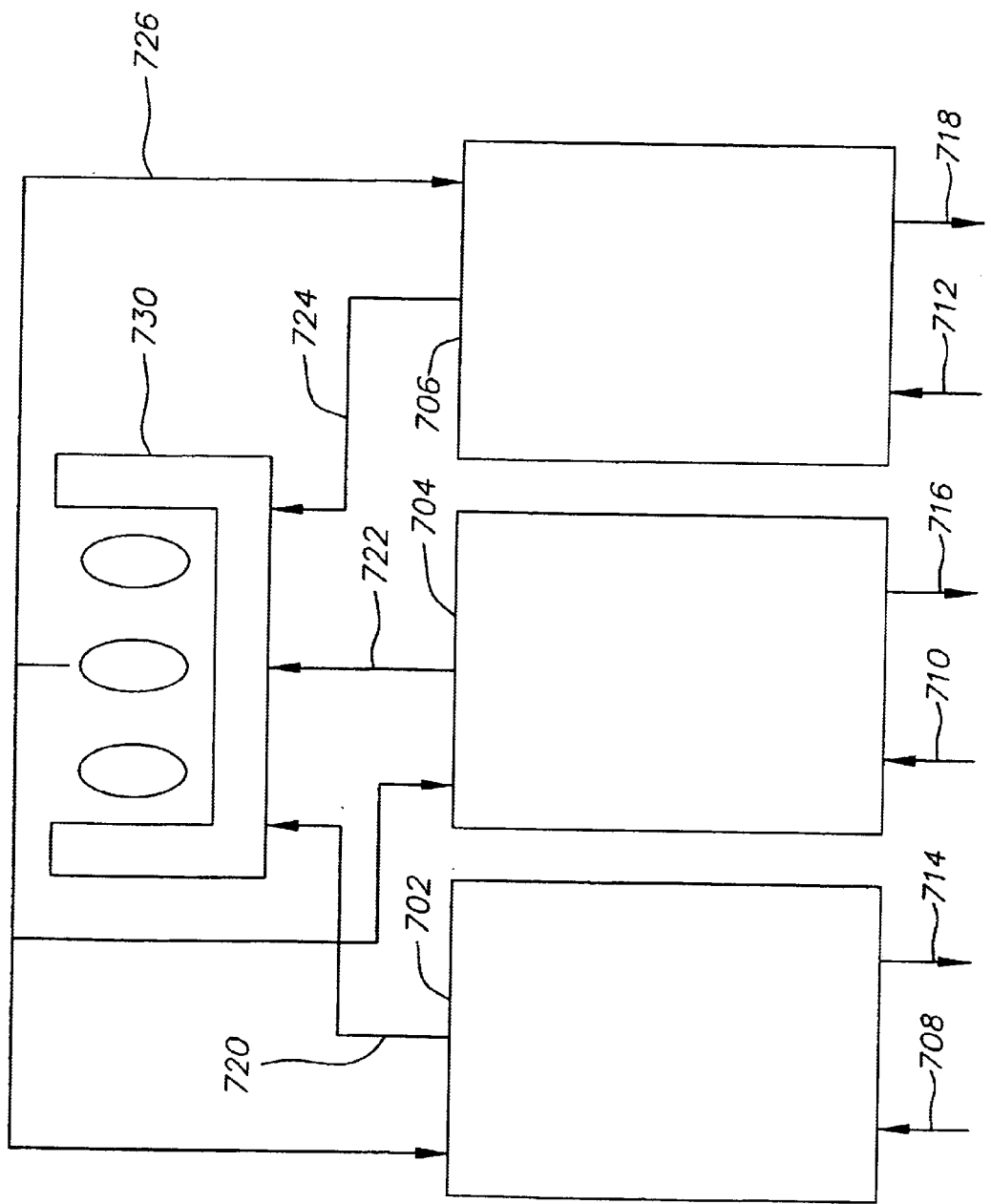
FIG. 7 is a block diagram of one embodiment for data aggregation socket (DAS) configuration.

FIG. 7 is a block diagram of one embodiment for data aggregation socket (DAS) 730 configuration. Referring to FIG. 7, DAS 730 is connected to a number of sockets 702, 704, 706. Each socket 702, 704, 706 receives frames of data through input 708, 710, 712 respectively. Each socket 702, 704, 706 sends data to DAS 730 through connection 720, 722, 724 respectively. Services 302 within DAS 730 aggregate and combine the data and transmit the data from DAS 730 via connection 726 to sockets 702, 704, 706. Each socket 702, 704, 706 outputs data through connections 714, 716, 718, respectively. DAS 730 collects data from multiple sockets and processes the aggregated data. For example, DAS 730 may be used to process telephone conference calls and other applications that require data aggregation.

In one embodiment, a host sends a request to allocate a new DAS 730 specifying a maximum number of inputs, the specific services to run, and frame size. For example, the host may send a request to allocate DAS 730 for a teleconference. Prior to the initialization of DAS 730, a host application also allocates appropriate sockets 510 as described above. Sockets 702, 704, 706 all connect specific data input to the teleconferencing 730. When both the DAS 730 and sockets 702, 704, 706 are allocated, the host connects sockets 702, 704, 706 with DAS 730. In one embodiment, the host application switches pointers within the software to connect to DAS 730. Once a frame of data is available, DAS 730 receives the information and processes the information through the services within DAS 730. DAS 730 outputs the aggregated data to each of the sockets 702, 704, 706. DAS 730 may be allocated and de-allocated dynamically. The connection between DAS 730 and individual sockets 702, 704, 706 may be established or disconnected dynamically.

Figure 8:
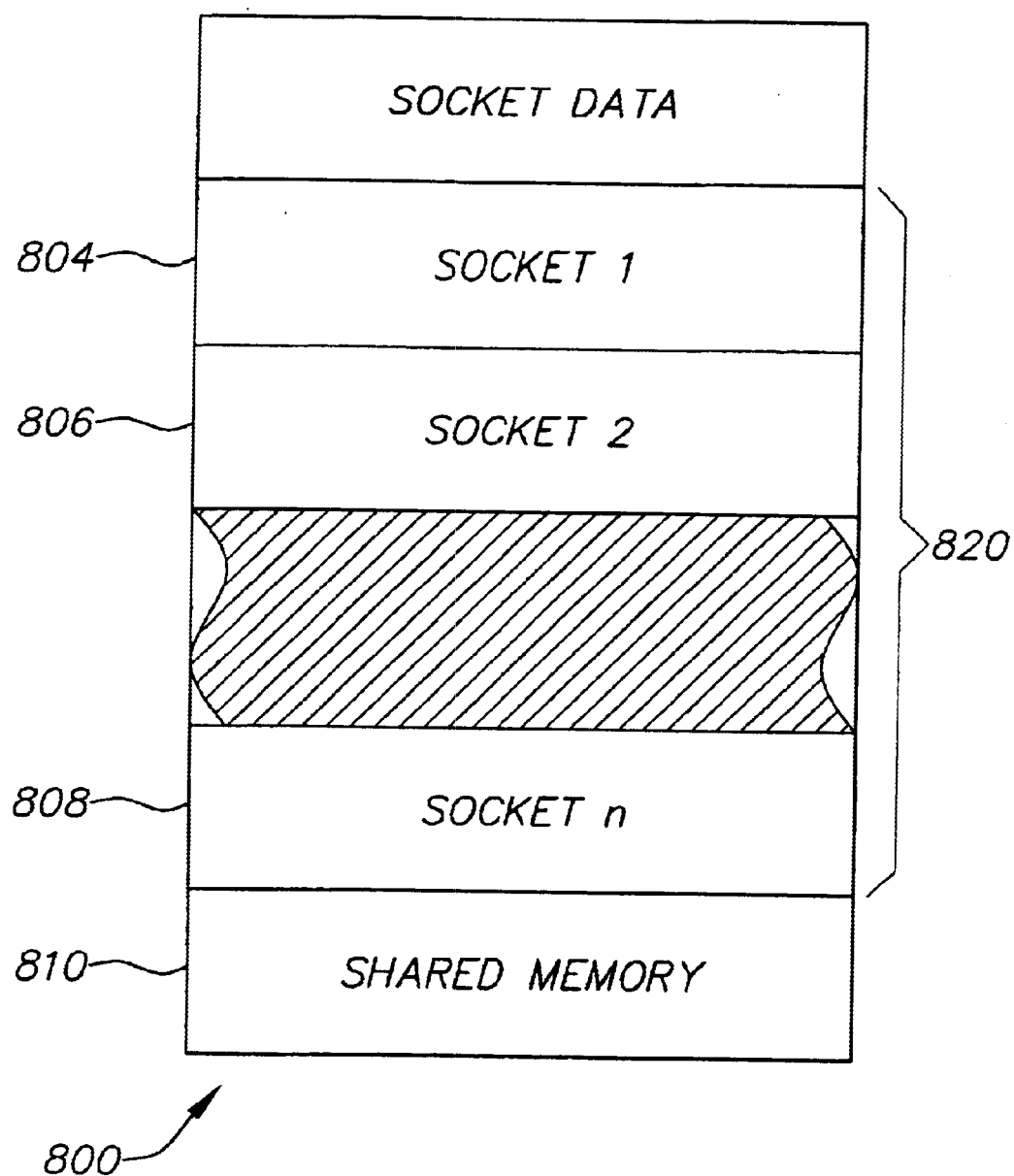
FIG. 8 is a block diagram of one embodiment for socket data.

FIG. 8 is a block diagram of one embodiment for socket data 800 used by multi-channel, multi-service system 100. Socket data 800 includes from 1 (804) to n (808) sockets 820. In addition, socket data 800 includes a shared memory 810. Socket data 800 is used to store sockets 306 as they are dynamically created, initialized, and used. In one embodiment, socket data 800 resides in cluster memory 212. In alternate embodiments, socket data 800 may reside in shared SRAM 206, or external DRAM 214. DRAM 214 is used when socket data 800 will not fit in duster memory 212. In one embodiment, socket data 800 may reside in DRAM 214 and is moved to cluster memory 212 as needed.

In one embodiment, each service 302 is assigned a type. When data is run through the socket 306, the control information for the data may be configured to be processed only by a given type of service 302, for example, a type 2 service 302. In addition, service 302 can instruct a socket 306 to not run or "unplug" certain services 302 further along in the socket 306 just for this frame of data. After the frame of data is processed, sockets 306 are "plugged" in for subsequent frames of data.

In addition, during the operation of a socket 306, it is sometimes necessary for one service 302 to communicate with another service 302 in the service stack 304. Services 302 may communicate with one another using a socket wide shared memory 810. Services 302 may pass control information and data to other services 302 within a socket 306 via shared memory 810. For example, if a dial tone detect is found in an initial socket service, the socket 306 should not run the voice decode service. Thus, the initial tone detect service may place the information that the tone has been detected in shared memory 810. When a subsequent service 302 is initialized or run, the service 302 reads the shared memory 810 and determines that a tone detect has been found and the services bypassed. Shared memory 810 is allocated at the time a socket 306 is allocated. A pointer to shared memory 810 is passed to the initializing routine of each service 302. Service 302 uses this pointer as necessary to communicate with other services 302. The size of shared memory 810 is the same for all sockets 306 and is specified within configuration setup.

FIG. 9a is a block diagram of one embodiment for a control aggregation socket (CAS) 908 configuration. Referring to FIG. 9a, CAS 908 collects all control information coming out of control sockets and sends aggregate information to a host. In addition, CAS 908 collects the control information coming into the system and distributes the aggregate control information to the appropriate control socket, either SCS 902, 904, or platform control socket (PCS) 906. In one embodiment, users may install or modify services 302 within CAS 908. CAS 908 receives messages form host control and passes the messages to the appropriate service within the appropriate socket 306. CAS 908 splits the host control to the appropriate socket 306 depending on the address of the control information. In one embodiment, the address hierarchy is the subsystem, board, chip, socket, and service. CAS 908 sends the control information to the appropriate service 302 and socket 306 indicated by the host.

PCS 906 is a specialized socket that runs on the main processor when the system boots. It is the only socket 306 that has knowledge of system wide resources. PCS 906 manages all resources, including allocating the SCSs 902, 904 to dusters 202, allocating TDM time slots, and allocating bus channels. Applications may not allocate or deallocate any services within PCS 906. Specifically, PCS 906 boots clusters 202 and chips 108, loads and unloads services 302, creates and destroys SCSs 902, 904, sends a heartbeat to the host 102, and detects if a cluster 202 is inoperative.

PCS 906 monitors the resources on the chip including instruction memory available. As the traffic pattern of acquired services changes, the operating system may unload and load services as required. This is done without affecting the channels that are running on the system.

Figure 9B:
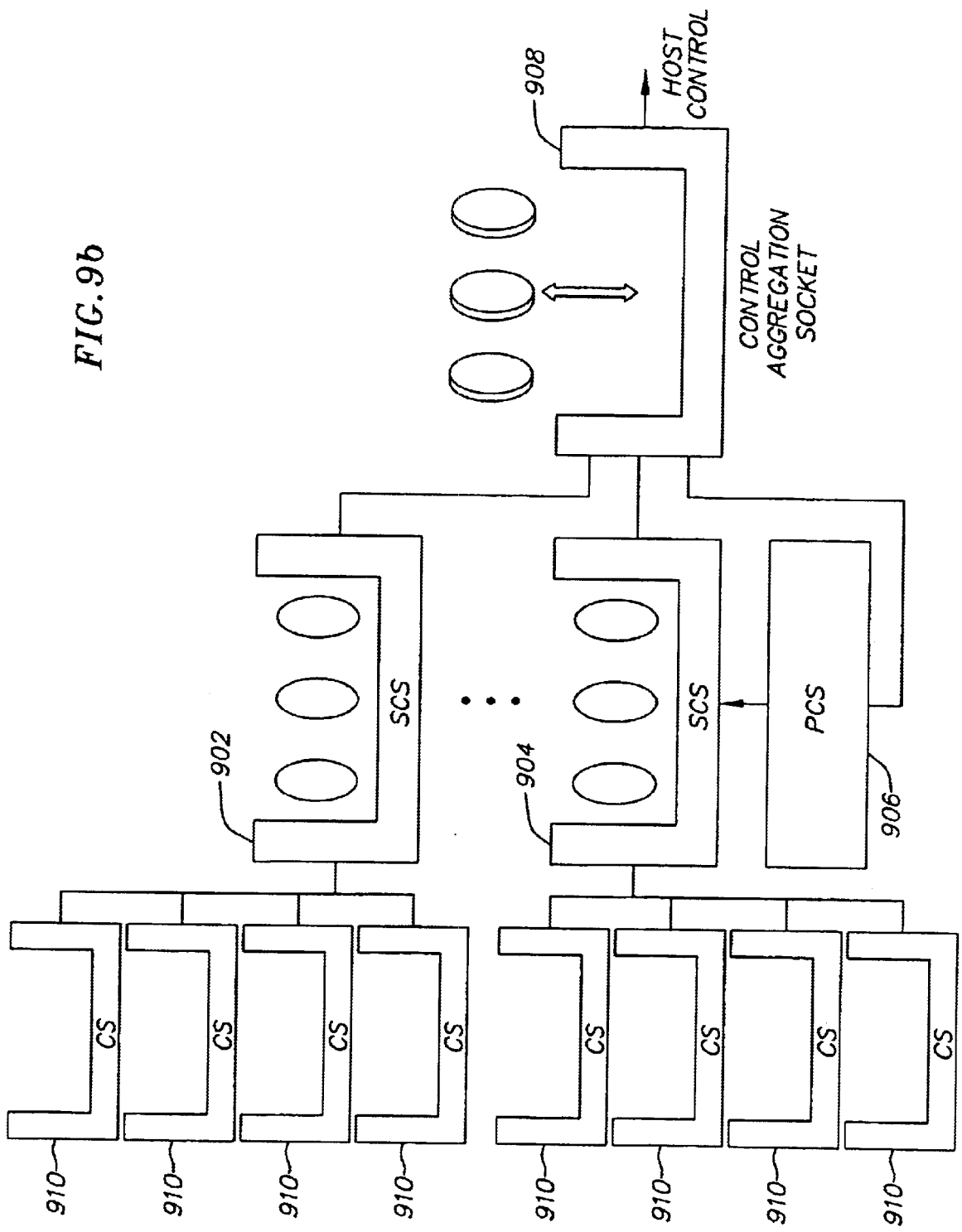
FIG. 9b is another embodiment for a control aggregation socket configuration.

FIG. 9b is another embodiment for a control aggregation socket 908 configuration. CAS 908 is connected to both PCS 906 and a number of SCSs 902, 904. Each SCS 902, 904 is connected to a number of channel sockets 910.

Figure 10:
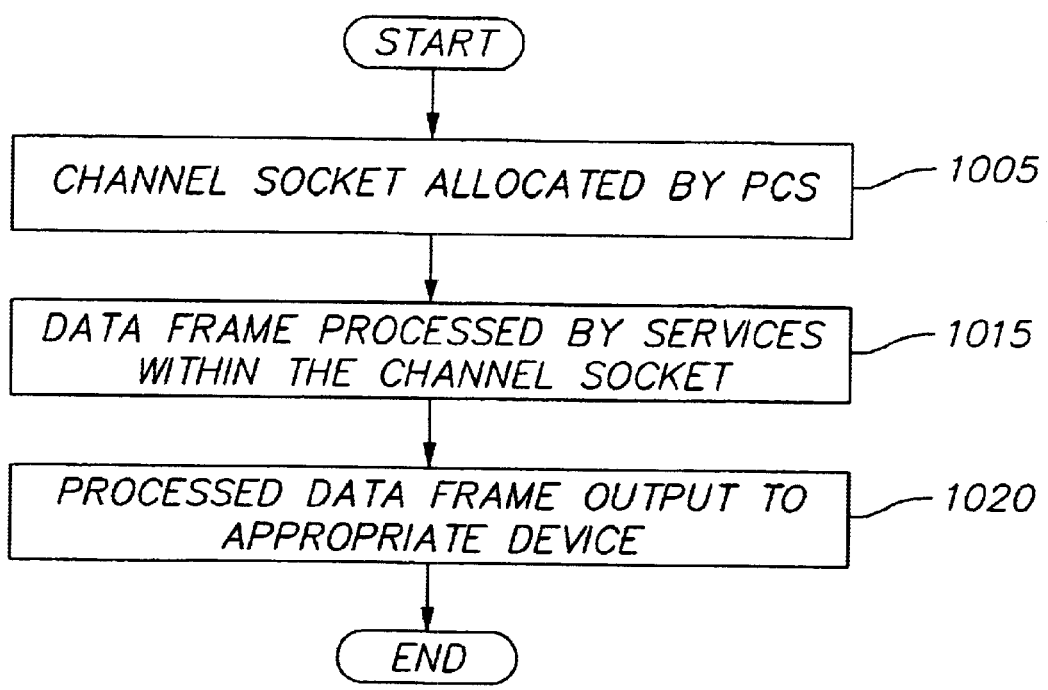
FIG. 10 is a flow diagram of one embodiment for the processing of data and information by channels.

FIG. 10 is a flow diagram of one embodiment for the processing of data and information by channel sockets 510. Initially at processing block 1005, PCS 906 dynamically allocates channel socket 510 at the request of host 102. The creation of a channel socket 510 is described in reference to FIG. 11 below.

Once channel socket 510 is allocated, data is received by channel socket 510. In one embodiment, channel socket 510 may receive control information for the processing of the data from SCS 902. Data may be received from any physical device interface connected to system 100. The data is processed by services 602 within a socket 306. The operating system within system 100 may change the flow of information through different channel sockets 510 depending on the need of the physical devices attached to the channel sockets 510. If a service stack 304 within channel socket 510 is incompatible with the incoming data, channel socket 510 notifies the operating system to change the flow of information. Operating system then redirects the flow to another existing channel socket 510 with the proper service stacks 304 or creates a new channel socket 510.

At processing block 1015, the data frame is processed by services 302 within channel socket 510. In one embodiment, services 302 are dynamically allocated when the first frame of data is received by channel socket 510. In an alternate embodiment, services 302 may be allocated at the time channel socket 510 is allocated. Services 302 process the data depending on the requirements of the data. For example, service 302 may be dynamically allocated to process telephone voice data. In one embodiment, data may be aggregated using a data aggregation socket 730 to combine the data. The data aggregation socket 730 may be utilized in a telecommunications teleconferencing application.

At processing block 1020, the processed data frames are output to the appropriate device interfaces. Processing blocks 1015 and 1020 are executed as long as data frames are supplied. After all data frames have been processed, system 100 may dynamically deallocate the channel socket 510. System 100 dynamically allocates the deallocates services 302 and sockets 306 as required by system 100 in order to fully take advantage of the limited physical channels within system 100. Thus, system 100 operates as a multi-channel, multi-service platform within a single channel development environment.

Figure 11:
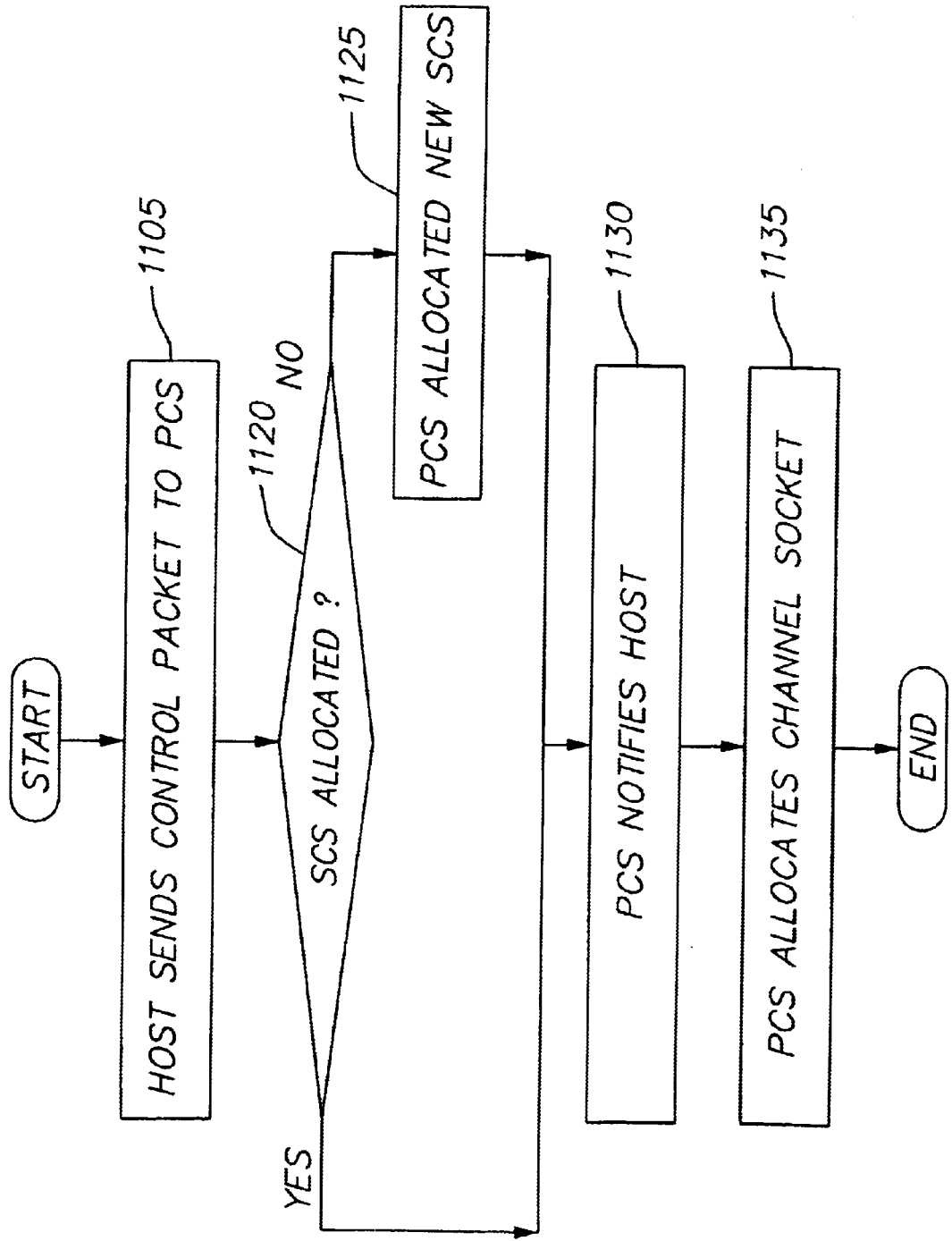
FIG. 11 is a flow diagram of one embodiment for setting up channel sockets.

FIG. 11 is a flow diagram of one embodiment for setting up channel sockets 510. Initially at processing block 1105, host 102 sends control packet to PCS 906. The control packet indicates the type of channel socket 510 that host 102 needs to allocate to process a given data flow. For example, host 102 may need to allocate a line-to-packet, packet-to-packet, or line-to-line control packet. The packet contains a top to bottom order list of service 302 names to be allocated into socket 306 to create a service stack 304. PCS 906 determines if the required services 302 have been loaded and if the required services 302 have been registered with the operating system. If any of the services 302 are not available, PCS 906 informs host 102. In addition, PCS 906 determines if resources are available to allocate the required sockets 306. If resources are not available, PCS 906 informs the host 102 that the operating system lacks sufficient resources to allocate a socket.

At processing block 1120, PCS 906 determines if any SCSs 902, 906 with the same service stack 304 already exist. If the SCSs 902, 904 already exist, processing continues at processing block 1130. If the SCS does not exist, processing continues at processing block 1125.

At processing block 1125, PCS 906 allocates the appropriate SCS for the service configuration. In one embodiment, PCS 906 loads the appropriate control services into shared SRAM in the order required by the service stack.

At processing block 1130, after PCS 906 sets up the new SCS 902, the PCS 906 notifies the host application that the SCS is set up. PCS then sets up CS. SCS then completes the channel service socket allocation by sending socket parameters to the socket. Such parameters may include, for example, tail length of echo cancellation (EC).

At processing block 1135, CS 510 initializes services 302 by calling their initialization functions. In an alternate embodiment, services 302 may be allocated at the time the first data frame is received by CS 510. When host 102 is ready to begin processing data through a given socket 306, host 102 instructs SCS 502 to start CS 510. This initializes the data handling of the socket 510. SCS 502 starts CS 510 and informs host 102 that CS 510 is configured and running.

Figure 12:
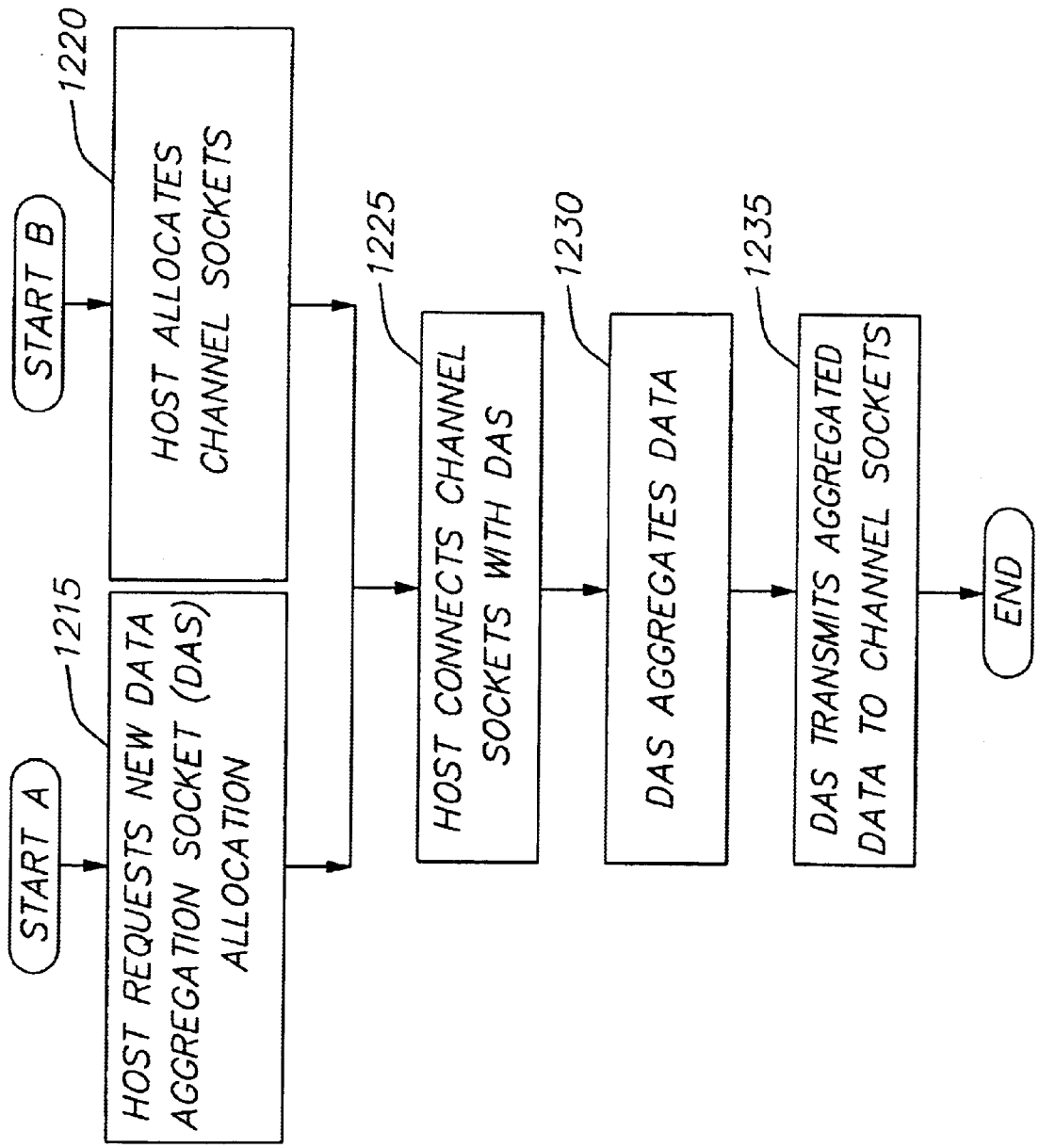
FIG. 12 is a flow diagram of one embodiment for creating a data aggregation socket (DAS)

FIG. 12 is a flow diagram of one embodiment for creating a data aggregation socket (DAS) 730. Prior to creation of DAS 730, host 102 allocates the appropriate channel sockets 510 for processing the data at processing block 1220. The allocation of channel sockets 510 is as described above in reference to FIG. 11.

Independent of the channel socket 510 allocation, host 102 also requests that the DAS 730 be allocated. At processing block 1215, the host sends a request to allocate a new DAS 730 with a maximum number of inputs, the specific services to be run, and the frame size. (The frame size is the number of samples on each of the connected inputs.) When both DAS 730 and some number of channel sockets 510 are allocated, processing continues at processing block 1225. At processing block 1225, the host connects channel sockets 510 with the DAS.

At processing block 1230, DAS 730 aggregates the data by invoking service handlers within DAS 730 once a frame's worth of data is available on each of the connected inputs from the channel sockets 510. DAS 730 aggregates the data and outputs the specific data. The data is aggregated by server 302 within a socket 510. In one embodiment, aggregation is defined by a customer or user prior to fabrication.

At processing block 1235, the output of the last DAS 730 service 302 broadcasts the data to the inputs of all connected channel sockets 510. The aggregated data is processed by the individual channel sockets 510. DAS 730 may be created or destroyed dynamically and the connection between the DAS 730 and channel sockets 510 may be established dynamically.

Figure 13:
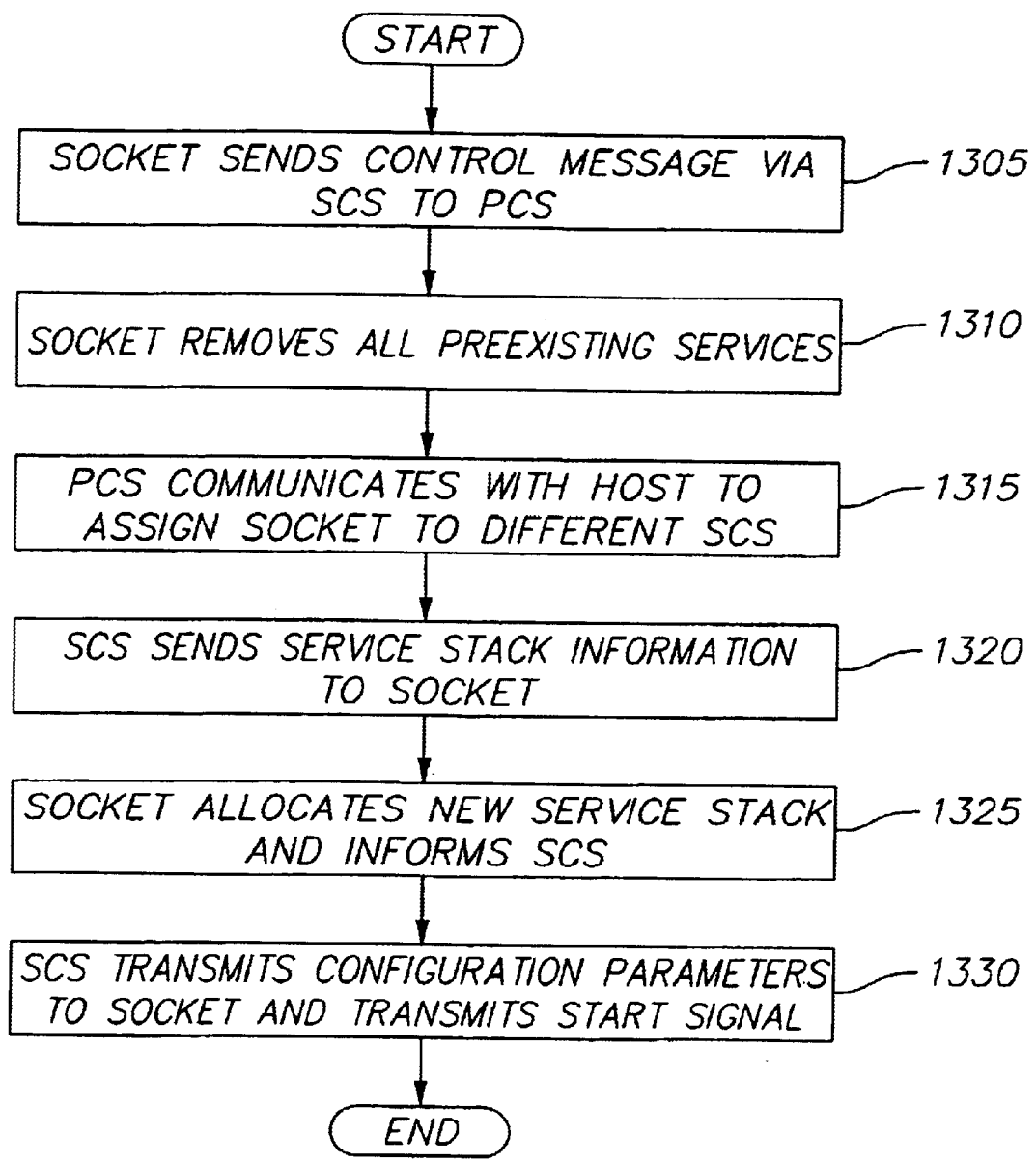
FIG. 13 is a flow diagram of one embodiment for the switching of sockets between service control sockets.

FIG. 13 is a flow diagram of one embodiment for the switching of sockets 306 between SCSs 502. When a socket 306 or a service 302 within a socket detects that the current channel socket 510 needs to be handled by another service stack 304, the operating system must switch to a different service stack 304. For example, if a voice service stack detects that a call needs to be switched to a fax service stack, a new service stack 304 must be used. Initially at processing block 1305, service 302 sends a control message to its SCS 502 that is forwarded to the PCS 906. The message may contain any configuration information that the new service stack 304 might need to receive and the message contains the information that a new stack 304 must be used.

At processing block 1310, channel socket 510 removes or de-allocates all its preexisting services. At processing block 1315, PCS 906 communicates with host 102 to assign a socket 306 to a different SCS 502. PCS 906 assigns a socket 306 to a different SCS 502 based on the new service stack 304. If the service stack 304 does not exist, PCS 906 may create a new SCS 502 based on the new service stack 304 requirements.

At processing block 1320, SCS 502 sends the service stack information to the socket 306. At processing block 1325, socket 306 allocates the new service stack 304 and informs SCS 502 that the stack 304 is available for processing.

At processing block 1330, SCS 502 transmits configuration parameters and a start signal to the new socket 306.

Thus, channel sockets 510 may be dynamically created as required. SCS 502 controls the physical or hardware channel while the channel sockets 510 process the data. Resource management for determining the cost of n channel sockets 510 and determining the availability resources to see if n channel sockets 510 may be run may be calculated by the PCS 906 or by more remote resources with the knowledge of the resources within system 100. The operating system, thus, may use a single hardware channel for the processing of multiple channel data types.

In one embodiment there are three types of channel sockets 510 utilized: line-to-packet, packet-to-packet, and line-to-line. Line-to-packet sockets are always connected to the line side at one end of the packet and the packet side at the other end of the channel. Some voice and modem stacks use line-to-packet sockets. These sockets process a frame's worth of data. The frame size is specified in terms of a number of bytes in the line side. One of the services will be responsible for setting the frame size. For example, the codes are expected to set the frame size in the case of a voice processing. The frame size may be changed at any time during the life of the socket. The socket reads a frame's worth of data. The data received from the line side may be in different format from the format expected by the services. In this case, the operating system performs the appropriate conversion of the data. After the data conversion, the socket calls the data processing functions of each service in order. The arguments to these functions are the pointers to the data in the shared memory and the data length in bytes.

After the data processing functions of all the services are called, the socket expects a packet of input data form the packet network. If a packet has arrived, the socket converts the cell base data to flat data and calls the data processing functions of all the services. The arguments to these functions are the pointers to the data and the data length in bytes. If, however, no packets have arrived, the socket calls these functions with the data length set to zero. This allows a socket to send meaningful data on the line even if no packet is available at the time. Both the voice stack and modem stack require this mechanism.

Packet-to-packet sockets are always connected to the packet side at both ends of the socket. However, the packet length may be different in each direction of data flow. Both ends of the sockets process packet size data and processing occurs whenever data appears on either end.

Line-to-line sockets are connected to the line side at both ends of the socket. The socket processes a frame's worth of data in both directions of data flow. The frame size in each direction is the same. Line-to-line sockets may perform standard line side coding and decoding transformations on the data on both ends. The conversion setting on both ends does not need to be the same.

In the foregoing specification, the invention has been described with reference to specific exemplary embodiments thereof. It will, however, be evident that various modifications and changes may be made thereto without departing from the broader sprit and scope of the invention as set forth in the appended claims. The specification and drawings are, accordingly, to be regarded in an illustrative rather than a restrictive sense.

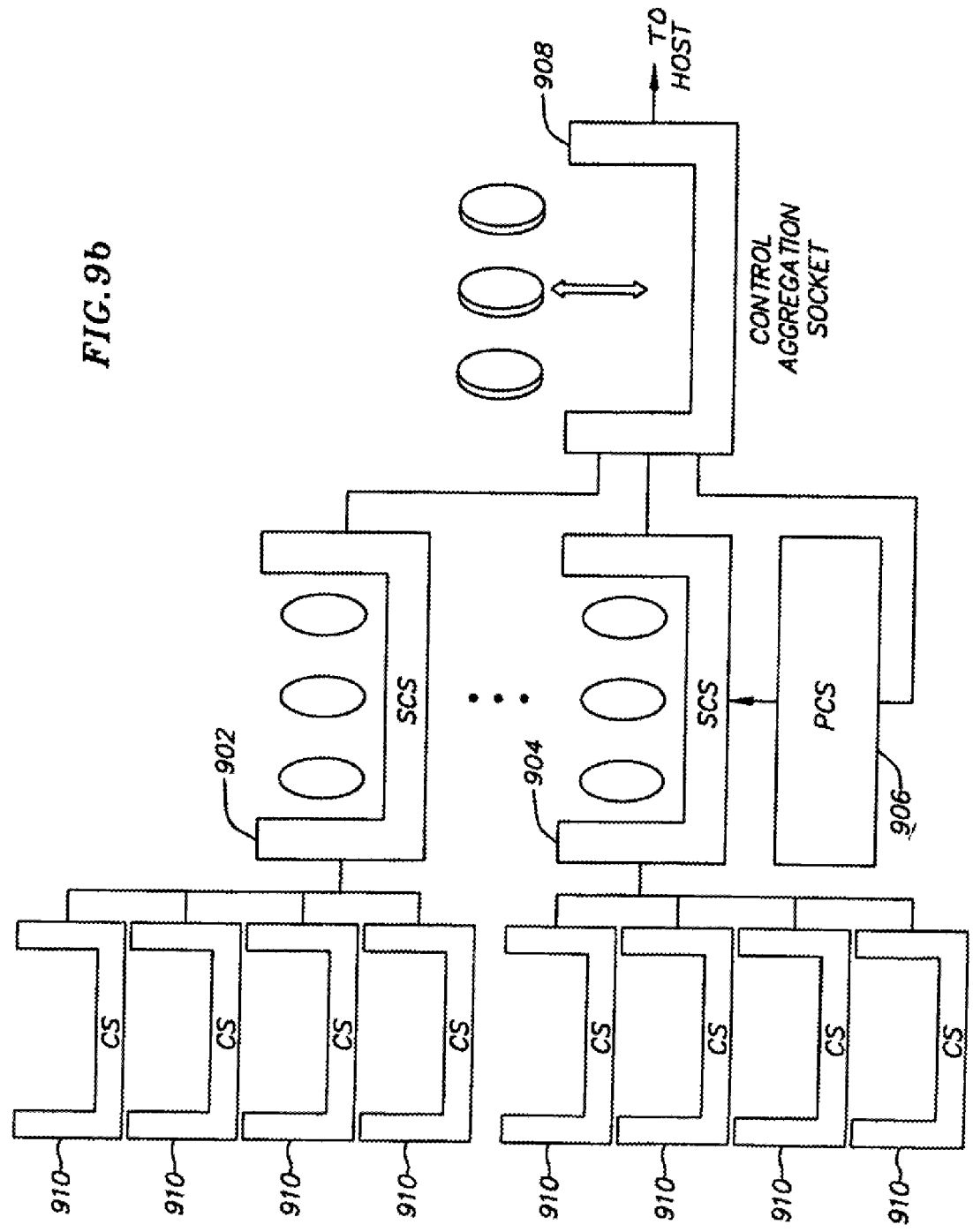

What is claimed is:

1. A method of processing a data flow in a multi-channel, multi-service environment, the method comprising:
   generating a control packet to control allocation of at least one socket based upon type of processing required on data, wherein the at least one socket comprises a plurality of dynamically allocated services in the form of a service stack and each service is a self contained set of instructions including data input/output, control, and a defined interface;
   dynamically allocating the at least one socket in accordance with the control packet; and
   processing the data using the at least one dynamically allocated service.

2. The method of claim 1 further comprising:
   transferring the processed data to a device interface.

3. The method of claim 1 wherein the service stack is a linked set of services that provide a larger processing unit than a service.

4. The method of claim 1 wherein the at least one socket is allocated based upon a type of data.

5. The method of claim 1 further comprising:
   de-allocating the at least one socket once all the data is processed.

6. The method of claim 1 wherein the at least one socket is allocated after a first frame of data has been received.

7. The method of claim 1 wherein allocating further comprises:
   determining if a socket for a data type already exists;
   if the socket does not exist allocating a service control socket for the data type; and
   notifying a host that the service control stack has been created.

8. The method of claim 7 further comprising determining the availability of resources for the socket.

9. The method of claim 7 wherein the service control socket includes a plurality of control services.

10. The method of claim 7 wherein the service control socket controls a unique set of services.

11. The method of claim 7 further comprising receiving the control packet from a host.

12. The method of claim 11 wherein the control packet includes a top to bottom order list of services.

13. The method of claim 7 wherein notifying further comprises sending socket parameters to the socket.

14. The method of claim 7 wherein allocating the socket further comprises initializing the plurality of services.

15. The method of claim 14 wherein initializing is performed during allocating of the socket.

16. The method of claim 14 wherein initializing is performed when a first data frame is received.

17. The method of claim 1 further comprising:
    allocating at least one channel socket in accordance with the control packet;
    allocating a data aggregation socket in accordance with the control packet;
    aggregating data in response to receiving the data from the at least one channel socket; and
    outputting the aggregated data to the at least one channel socket.

18. The method of claim 17 wherein allocating a data aggregation socket further comprises:
    transmitting a request to allocate the data aggregation socket.

19. The method of claim 18 wherein the request includes a maximum number of inputs, a list of the plurality of services to allocate, and a frame size.

20. The method of claim 17 further comprising allocating a service control socket in accordance with the control packet, wherein the service control socket includes a plurality of control services.

21. The method of claim 20 wherein the service control socket controls a unique set of services.

22. The method of claim 20 further comprising receiving the control packet from a host.

23. The method of claim 20 further comprising notifying a host that the service control socket has been allocated by sending socket parameters to the channel socket.

24. The method of claim 1 further comprising:
    assigning a channel socket to a new service control socket;
    allocating a new service stack for the new service control socket; and
    configuring the channel socket.

25. The method of claim 24 further comprising sending a control message to a platform control socket.

26. The method of claim 24 further comprising de-allocating all preexisting services within the channel socket.

27. A system for processing a data flow in a multi-channel, multi-service environment, the system comprising:
    a host processor configured to generate a control packet to control allocation of at least one socket and allocation of at least one service included in the at least one socket, based upon type of processing required on data, wherein the at least one socket comprises a plurality of dynamically allocated services in the form of a service stack and each service is a self contained set of instructions including data input/output, control, and a defined interface;

a main processor coupled to the host processor, wherein the main processor dynamically allocates the at least one socket in response to the generated control packet; and means for processing the data using the at least one dynamically allocated service.

28. A computer readable medium comprising instructions, which when executed on a processor, perform a medium for processing a data flow in a multi-channel, multi-service environment, comprising:

generating a control packet to control allocation of at least one socket based upon type of processing required on data, wherein the at least one socket comprises a plurality of dynamically allocated services in the form of a service stack and each service is a self contained set of instructions including data input/output, control, and a defined interface;

dynamically allocating the at least one socket in accordance with the control packet; and processing the data using the at least one dynamically allocated service.

29. The medium of claim 28 further comprising:
transferring the processed data to a device interface.

30. The medium of claim 28 wherein the at least one socket is allocated based upon a type of data.

31. The medium of claim 28 further comprising:
de-allocating the at least one socket once all the data is processed.

32. The medium of claim 28 wherein the at least one socket is allocated after a first frame of data has been received.

33. The medium of claim 28 wherein allocating further comprises:
determining if a socket for a data type already exists;
if the socket does not exist allocating a service control socket for the data type; and
notifying a host that the service control stack has been created.

34. The medium of claim 33 wherein the service control socket includes a plurality of control services.

35. The medium of claim 33 wherein the service control socket controls a unique set of services.

36. The medium of claim 33 further comprising receiving the control packet from a host.

37. The medium of claim 36 wherein the control packet is selected from the group comprising line-to-packet control packet, packet-to-packet control packet, or line-to-line control packet.

38. The medium of claim 33 wherein notifying further comprises sending socket parameters to the socket.

39. The medium of claim 33 wherein allocating the socket further comprises initializing the plurality of services.

40. The medium of claim 28 further comprising:
allocating at least one channel socket for a data type;
allocating a data aggregation socket for the data type;
aggregating data in response to receiving the data from the at least one channel socket; and
outputting the aggregated data to the at least one channel socket.

41. The medium of claim 40 wherein allocating a data aggregation socket further comprises:
transmitting a request to allocate the data aggregation socket.

42. The medium of claim 40 wherein allocating a channel socket further comprises:
determining if a channel socket for a data type already exists;
if the channel socket does not exist allocating a service control socket for the data type; and
notifying a host that the service control stack has been created.

43. The medium of claim 42 wherein the service control socket includes a plurality of control services.

44. The medium of claim 42 wherein the service control socket controls a unique set of services.

45. The medium of claim 42 further comprising receiving the control packet from a host.

46. The medium of claim 42 wherein notifying further comprises sending socket parameters to the channel socket.

47. The medium of claim 28 further comprising:
assigning a channel socket to a new service control socket;
allocating a new service stack for the new service control socket; and
configuring the channel socket.

48. The medium of claim 47 further comprising sending a control message to a platform control socket.

49. The medium of claim 47 further comprising de-allocating all preexisting services within the channel socket.

50. A system for processing a data flow in a multi-channel, multi-service environment, the system comprising:

a host processor configured to generate a control packet to control allocation of at least one socket and allocation of at least one service included in the at least one socket, based upon type of processing required on data, wherein the at least one socket comprises a plurality of dynamically allocated services in the form of a service stack and each service is a self contained set of instructions including data input/output, control, and a defined interface; and a platform control socket configured to dynamically allocate the at least one dynamically allocated service to process the data flow in response to the generated control packet.

51. The system of claim 50 wherein the at least one socket is further configured to transfer the processed data to a device interface.

52. The system of claim 50 wherein the at least one socket comprises a plurality of services.

53. The system of claim 52 wherein the at least one socket provides a set of the plurality of services in the form of a service stack.

54. The system of claim 50 wherein the at least one socket is allocated based upon a type of data.

55. The system of claim 50 wherein the platform control socket is further configured to de-allocate the at least one socket once all the data is processed.

56. The system of claim 50 wherein the at least one socket is allocated after a first frame of data has been received.

57. The system of claim 50 wherein the platform control socket is further configured to determine if a channel socket for a data type already exists; configured to allocate a service control socket for the data type if the channel socket does not exist; and configured to notify a host that the service control stack has been created.

58. The system of claim 57 wherein the platform control socket is further configured to determine the availability of resources for the socket.

59. The system of claim 57 wherein the service control socket includes a plurality of control services.

60. The system of claim 57 wherein the service control socket is configured to control a unique set of services.

61. The system of claim 57 wherein the channel socket is configured to receive the control packet from the host processor.

62. The system of claim 57 wherein the platform control socket is further configured to send socket parameters to the socket.

63. The system of claim 57 wherein the platform control socket is further configured to initialize the plurality of services.

64. The system of claim 50 wherein the control packet is selected from the group comprising line-to-packet control packet, packet-to-packet control packet, or line-to-line control packet.

65. The system of claim 50 wherein the control packet includes a top to bottom order list of services.

66. The system of claim 50 further comprising:
a data aggregation socket configured to process a data type, configured to aggregate data in response to receiving the data from the at least one channel socket; and output the aggregated data to the at least one channel socket.

67. The system of claim 66 wherein the host processor is further configured to transmit a request to allocate the data aggregation socket to the platform control socket.

68. The system of claim 67 wherein the request includes a maximum number of inputs, a list of the plurality of services to allocate, and a frame size.

69. The system of claim 67 wherein the platform control socket is further configured to determine if a channel socket for a data type already exists; configured to allocate a service control socket for the data type if the channel socket does not exist; and configured to notify a host that the service control stack has been created.

70. The system of claim 69 wherein the service control socket includes a plurality of control services.

71. The system of claim 69 wherein the service control socket is configured to control a unique set of services.

72. The system of claim 69 wherein the channel socket is configured to receive the control packet from the host processor.

73. The system of claim 69 the platform control socket is further configured to send socket parameters to the channel socket.

74. The system of claim 50 further comprising:
a channel socket configured to allocate a new service stack for the new service control socket; and
a service control socket configured to initialize the channel socket.

75. The system of claim 74 wherein the platform control socket is further configured to assign the channel socket to the service control socket.

76. The system of claim 74 wherein the channel socket is further configured to send a control message to the platform control socket.

77. The system of claim 74 wherein the channel socket is further configured to de-allocate all preexisting services within the channel socket.

* * * * *

UNITED STATES PATENT AND TRADEMARK OFFICE
CERTIFICATE OF CORRECTION

PATENT NO. : 6,912,576 B1
APPLICATION NO. : 09/565580
DATED : June 28, 2005
INVENTOR(S) : Rustagi et al.

It is certified that error appears in the above-identified patent and that said Letters Patent is hereby corrected as shown below:

On the Title Page

(75) Inventors  Delete "Garald H. Banta",
Insert --Gareld H. Banta--

In the Drawings

Fig. 9b, Sheet 10 of 14  Delete Drawing Sheet 10 and substitute therefore the Drawing Sheet, consisting of Fig. 9b, as shown on the attached page

In the Claims

Column 16, line 14, Claim 73  After "claim 69",
Insert --wherein--

Signed and Sealed this

Fifteenth Day of April, 2008

JON W. DUDAS
*Director of the United States Patent and Trademark Office*